(12) United States Patent
Cairo

(10) Patent No.: US 6,979,928 B2
(45) Date of Patent: Dec. 27, 2005

(54) AXIAL RETENTION FEATURE FOR RESTRAINING COMPOSITE REINFORCING RINGS

(75) Inventor: Ronald Ralph Cairo, Greer, SC (US)

(73) Assignee: General Electric Company, Schenectady, NY (US)

(*) Notice: Subject to any disclaimer, the term of this patent is extended or adjusted under 35 U.S.C. 154(b) by 189 days.

(21) Appl. No.: 10/707,271

(22) Filed: Dec. 2, 2003

(65) Prior Publication Data
US 2005/0116580 A1 Jun. 2, 2005

(51) Int. Cl.$^7$ ............................................. H02K 3/48
(52) U.S. Cl. ...................... 310/214; 310/262; 310/264; 310/271
(58) Field of Search .............................. 310/214, 216, 310/217, 262, 264, 265, 271

(56) References Cited

U.S. PATENT DOCUMENTS

| | | | | |
|---|---|---|---|---|
| 5,046,359 A | * | 9/1991 | Layport | 73/170.33 |
| 5,698,917 A | * | 12/1997 | Shultz | 310/87 |
| 6,239,527 B1 | | 5/2001 | Kaminski et al. | 310/168 |
| 6,291,919 B1 | | 9/2001 | Ganti et al. | 310/261 |
| 6,313,561 B1 | | 11/2001 | Nygard et al. | 310/261 |
| 6,495,942 B1 | | 12/2002 | Kaminski et al. | 310/262 |

* cited by examiner

Primary Examiner—Darren Schuberg
Assistant Examiner—Judson H. Jones
(74) Attorney, Agent, or Firm—Nixon & Vanderhye P.C.

(57) ABSTRACT

A magnetic shield assembly for confining rotor windings in a generator includes a substantially cylindrical tubular shield of two or more part-annular segments adapted to enclose the rotor windings; a plurality of axially spaced rings located on the tubular shield; and a plurality of annular spacers radially between the tubular shield and the plurality of rings and axially between adjacent rings to thereby present physical barriers to axial migration of the plurality of rings. In an alternative arrangement, the magnetic shield assembly for confining rotor windings in a generator includes a substantially cylindrical tubular shield of two or more part-annular segments adapted to enclose the rotor windings; a plurality of axially spaced rings located on the tubular shield, the rings having a radially inner surface with at least one surface depression therein; and epoxy adhesive located between the rings and the magnetic shield and bonded to the magnetic shield, with a release agent between the epoxy adhesive and the rings; and wherein the at least one surface depression is filled with cured epoxy adhesive, thus forming a mechanical barrier to axial migration of the rings on the magnetic shield.

17 Claims, 5 Drawing Sheets

AXIAL RETENTION FEATURE FOR RESTRAINING COMPOSITE REINFORCING RINGS

BACKGROUND OF INVENTION

This invention relates to generators used in land-based power generation systems and more specifically, to mechanical restraint configurations for preventing axial movement of composite material reinforcing rings used in rotor containment systems.

Certain generators manufactured by the assignee of this invention utilize carbon-epoxy (C/Ep) rings as an enclosure for restraining any radial outward movement of the copper coils and magnetic shield in a rotor assembly due to centrifugal forces during operation of the turbine. See, for example, U.S. Pat. Nos. 6,291,919 and 6,495,942. Startup and shutdown cycles combined with high frequency vibration provide sufficient energy to force the rings to move axially along an underlying magnetic shield, however, potentially covering cooling holes in the shield and creating rotor imbalance with associated bearing distress and an eventual reduction in reliability. Prior designs have utilized epoxy adhesive to secure the rings, but large differential thermal response characteristics between the C/Ep ring, epoxy adhesive and magnetic shield material (steel or nickel) have created a potentially significant problem. Specifically, if the adhesive rigidly bonds to both components, stresses due to differential thermal expansion will be sufficient to crack the adhesive, causing the ring to experience non-uniform loading with the inner diameter (loss of continuous elastic foundation) and axial movement.

Some prior designs have utilized a "slip plane" in the form of a polytetrafluoroethylene (such as Teflon®) film between the ring and epoxy adhesive, allowing the adhesive to only bond tightly to the magnetic shield material. Axial movement of the ring with respect to the adhesive was prevented by using radially oriented non-magnetic pins and/or hand-built dams of epoxy.

SUMMARY OF INVENTION

The present invention provides additional positive mechanical restraints against axial movement of the C/Ep support rings that can be retrofit to existing generators or incorporated in new operator designs. Two important design criteria are that the restraint mechanism cannot be metallic if it extends beyond the outer radius of the magnetic shield, i.e., into the magnetic field, and that the restraint mechanism cannot restrict or impede the efficacy of cooling holes resident in the magnetic shield.

In one exemplary embodiment of the invention, annular C/Ep spacers are provided that maintain desired spacing between the rings and that prevent axial migration of the rings. Specifically, each spacer is hat-shaped in transverse cross section such that the spacer includes a pair of flat ends; a flat, raised top surface; and a pair of ramps that connect the flat ends with the top surface. The top surface of each spacer is provided with either formed or machined slots for passing cooling air from the magnetic shield cooling holes into the radial gap between the rotor and stator. The spacers are formed with ramp angles α that match respective chamfer angles at the inner diameter of the composite rings and provide a reaction surface for restraining axial motion.

The annular spacers fit beneath the composite rings, i.e., radially between the magnetic shield and the composite rings, to provide a continuous elastic foundation. More specifically, each ring is seated in a "trough" formed by a pair of adjacent spacers. In other words, one flat end and one ramp of one spacer combine with one flat end and one ramp of an adjacent spacer to form a generally concave seat for the chamfered rings. Thus, the flat top surfaces of the rings are located between the spacers, and the ramp surfaces provide a positive mechanical barrier or restraint to axial migration of the rings. Although the spacers are otherwise free to slide on the magnetic shield, they are butted against surrounding fore and aft spacers. In addition, the end rings are fixed by a stop ring projecting radially above the shield, so that axial movement of any one or all of the spacers is minimized. Accordingly, axial movement is limited to the minimal clearance space between spacers, the totality of which is insufficient to permit blockage of cooling holes in the magnetic shield.

In a second exemplary embodiment, either a series of machined dimples (hemispherical cavities) or a machined full annular groove on the radially inner diameter or surface of the rings is utilized to capture epoxy adhesive and thereby provide mechanical positioning control and axial fixity. The adhesive in this instance is bonded to the magnetic shield but not to the rings due to the use of a release agent radially between the epoxy and the rings. The cured adhesive that fills the groove or dimples thus provides a mechanical restraint to axial migration of the rings.

Polytetrafluoroethylene (for example, Teflon®), boron nitride or other suitable material may be used as the release agent that prevents overstressing of the epoxy adhesive due to differential thermal expansion. Thus, the combination of a rigid bond to the magnetic shield and the mechanical interlock of the adhesive to the composite rings provide the required positive axial restraint and controlled stress rate.

Accordingly, in its broader aspects, the present invention relates to a magnetic shield assembly for confining rotor windings in a generator comprising a substantially cylindrical tubular shield of two or more part-annular segments adapted to enclose the rotor windings; a plurality of axially spaced rings located on the tubular shield; and a plurality of annular spacers radially between the tubular shield and the plurality of rings and axially between adjacent rings to thereby present physical barriers to axial migration of the plurality of rings.

In another aspect, the invention relates to a magnetic shield assembly for confining rotor windings in a generator comprising a substantially cylindrical tubular shield of two or more part-annular segments adapted to enclose the rotor windings; a plurality of axially spaced rings located on the tubular shield, the rings having a radially inner surface with at least one surface depression therein; and epoxy adhesive located between the rings and the magnetic shield and bonded to the magnetic shield, with a release agent between the epoxy adhesive and the rings; and wherein the at least one surface depression is filled with cured epoxy adhesive, thus forming a mechanical barrier to axial migration of the rings on the magnetic shield.

The invention will now be described in detail in connection with the drawings identified below.

DETAILED DESCRIPTION

Figure 1:
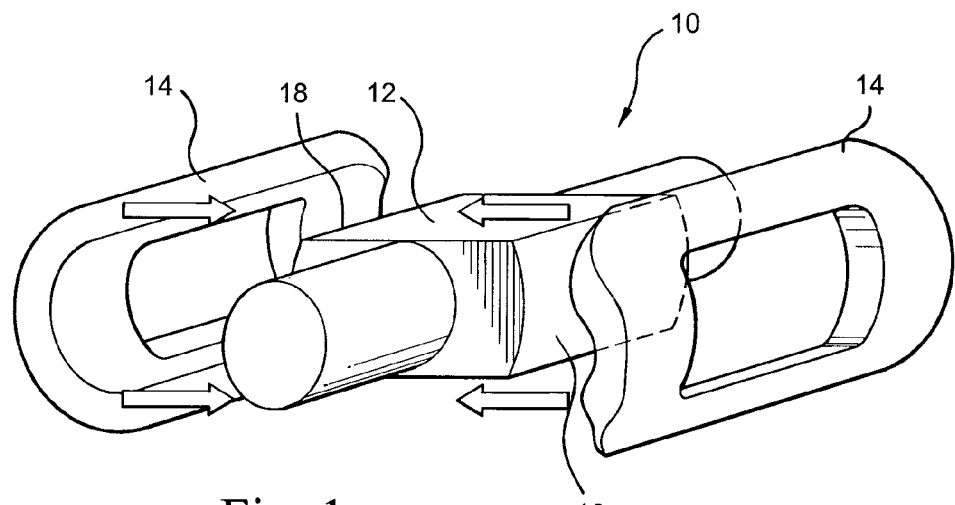
FIG. 1 is a simplified winding assembly drawing of a generator rotor.
Figure 2:
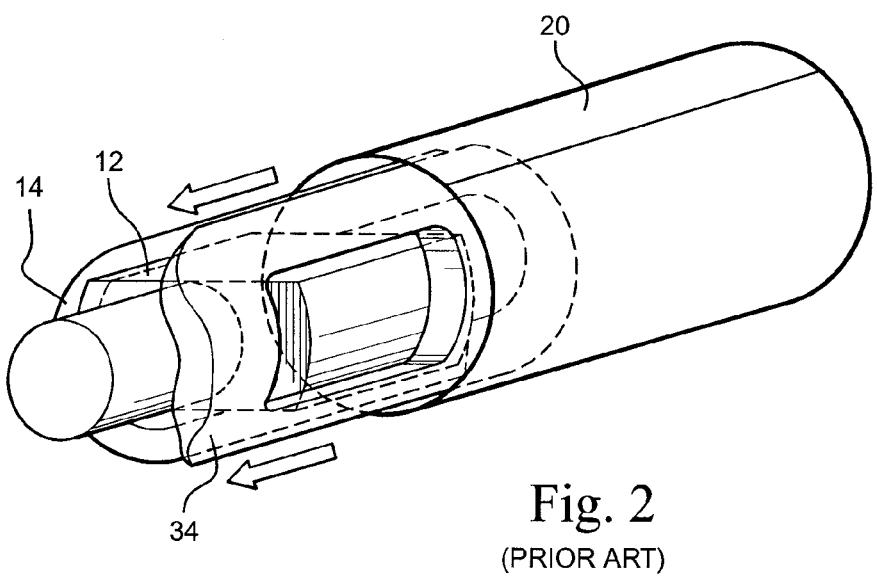
FIG. 2 is a simplified assembly drawing of a generator rotor including a surrounding magnetic shield.

With reference to FIGS. 1 and 2, a known generator rotor 10 includes a multi-pole magnetic core 12 (two-pole core shown) and a plurality of winding assemblies 14, one for each pole, and corresponding pole faces 16, 18. The construction and materials of the magnetic core 12 and winding assemblies 14 are known, and additional details thereof need not be provided.

Figure 3:
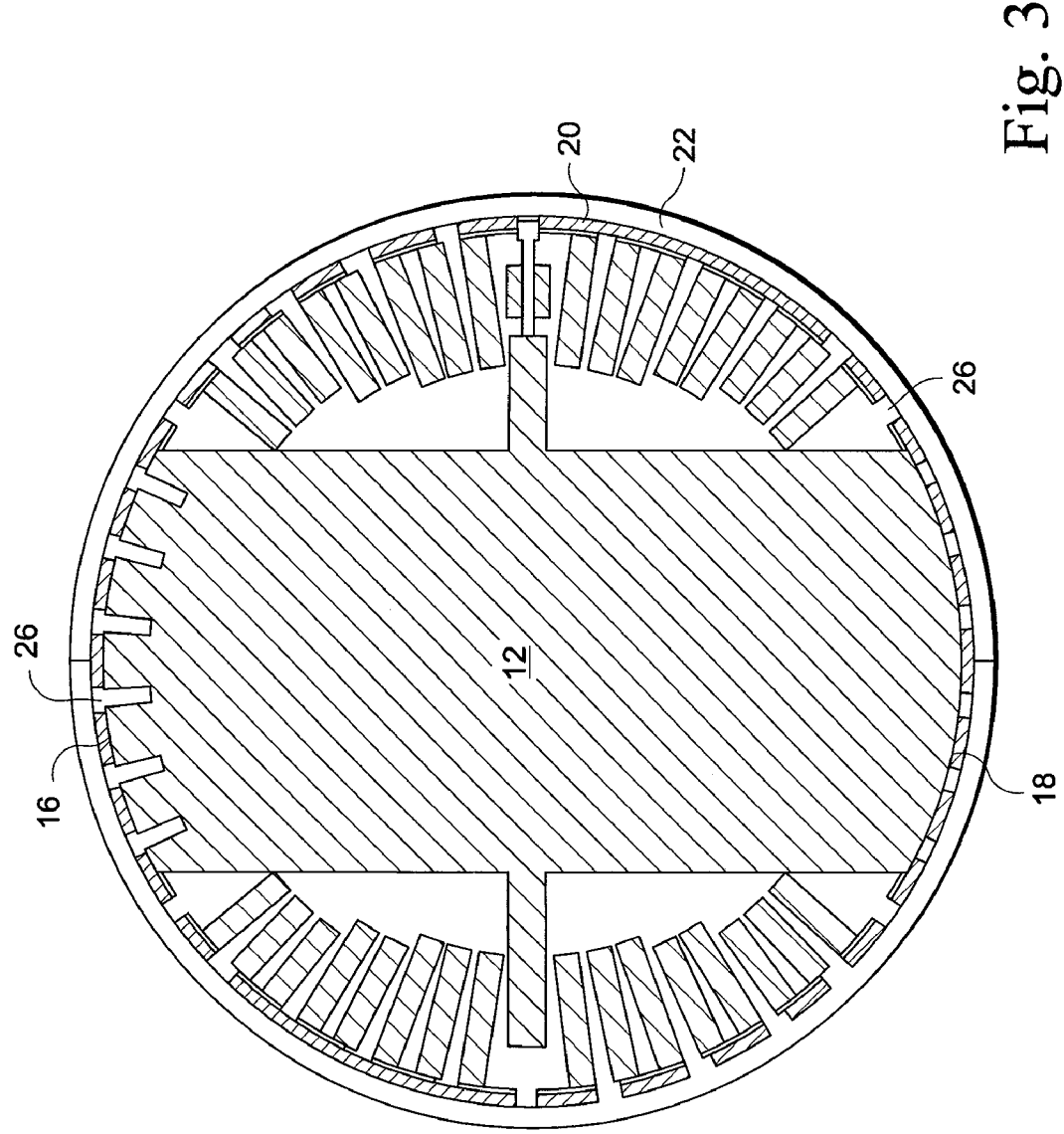
FIG. 3 is a simplified cross-section through a rotor of the type shown in FIG. 2.
Figure 6:
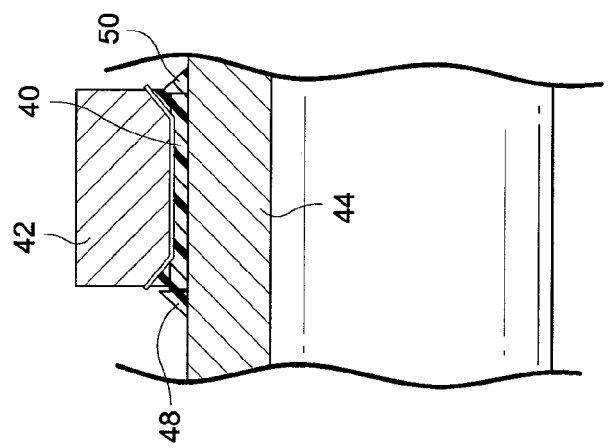
FIG. 6 is still another side elevation, also partly in section, illustrating yet another technique for restraining axial movement of the rings.
Figure 4:
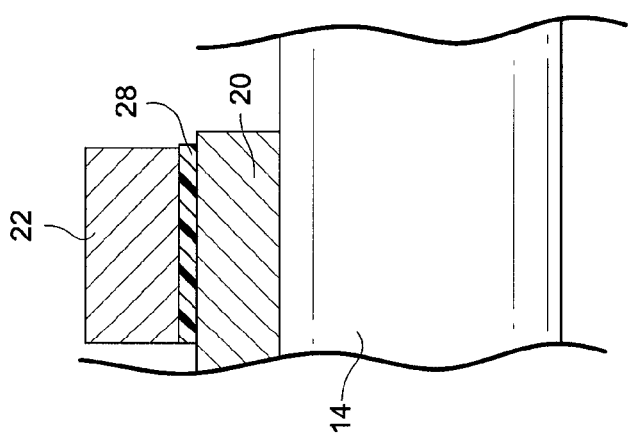
FIG. 4 is a simplified partial side elevation, also partly in section, illustrating one of a plurality of axial restraining ring bonded to a magnetic shield in accordance with one prior arrangement.

After the winding assemblies 14 are located over the parallel sided forging of the two-pole magnetic core 12, a magnetic enclosure or tubular shield 20 comprised of two or more part-annular segments is located over the assembly. With reference also to FIGS. 3 and 4, a plurality of annular C/Ep rings 22 (one shown) have been used to enclose the magnetic shield and thus to restrain the winding assemblies and magnetic shield against centrifugal forces during use of the generator. These rings 22 are typically constructed from a low density composite material, such as a carbon fiberglass fiber composite, and are configured to provide a means for discharging winding ventilation gas to a generator air gap 22 (not shown), between the rotor and surrounding stator. The composite material is preferred because of its high strength to weight ratio, but other materials may also be suitable as would be apparent to those of ordinary skill in the art.

The magnetic shield 20 is perforated with a plurality of ventilation holes 26 which serve to discharge ventilation to the air gap between the rotor and the surrounding fixed stator. It will be appreciated that the rings 22 are axially spaced as described above, so that the space between the rings coincides with the location of cooling holes 26 in the shield.

Referring especially to FIG. 4, one prior technique for restraining the rings 22 against axial movement relative to the magnetic shield 20 included bonding the rings 22 to the magnetic shield 20 by an epoxy adhesive 28. The adhesive 28 may be any suitable bonding adhesive with high temperature capabilities.

Thermal mismatch between the components has led to cracks in the adhesive 28, however, permitting axial migration of the affected rings 22, potentially far enough to cover an adjacent cooling hole or passage 26. The cumulative effect of additional cracks and further blockage of cooling holes may cause significant rotor imbalance and loss of cooling function. The fact that end restraints ultimately limit the extent of the axial shifting does not solve the problem.

Figure 5:
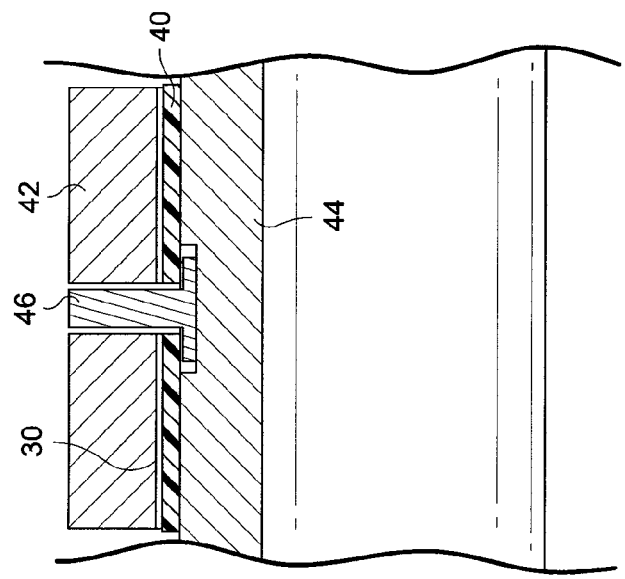
FIG. 5 is another partial side elevation, also partly in section, illustrating another known arrangement for restraining axial movement of the support rings.

With reference now to FIG. 5, some designs have utilized a "slip plane" formed by a suitable release agent in the form of a film 30 of polytetrafluoroethylene, boron nitride or the like, located between the epoxy adhesive 40 and the rings 42, so that the adhesive only bonds to the underlying magnetic shield 44. Axial movement of the rings relative to the shield 44 in this case is prevented by non-magnetic pins 46 anchored in the magnetic shield 40 and extending through the respective rings, and/or by hand-built dams 48 of epoxy 50 along opposite edges of the ring 52.

Figure 7:
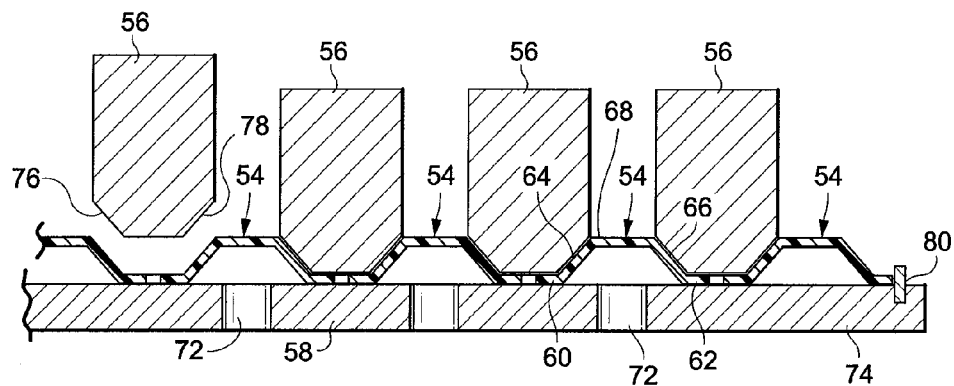
FIG. 7 is a partial side section, illustrating a mechanical axial restraint system for the composite rings on the rotor in accordance with a first exemplary embodiment of this invention.
Figure 8:
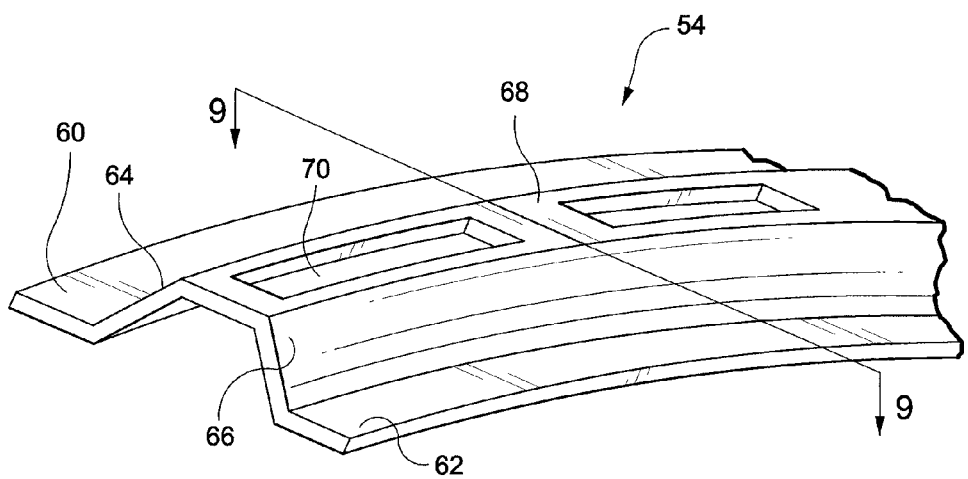
FIG. 8 is a partial perspective view of an individual spacer taken from FIG. 7.
Figure 9:
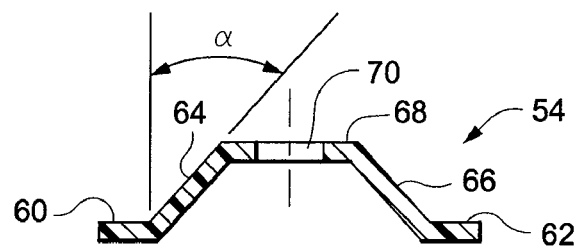
FIG. 9 is a transverse cross-section of the spacer taken along the line 9—9 in FIG. 8.

Turning to FIGS. 7–9, the present invention utilizes in one exemplary embodiment, a plurality of annular spacers 54 located axially between adjacent rings 56 and radially between the rings 56 and the magnetic shield 58 to form a mechanical barrier to axial migration of the rings. More specifically, each spacer 54 is an annular member, generally hat-shaped in transverse cross section as best seen in FIG. 9. Thus, the spacer 54 includes two flat ends or side sections 60, 62, a pair of ramps 64, 66 and a flat upper or top surface 68, raised relative to the ends 60, 62. Surface 68 is formed with a plurality of cooling air slots 70. Note that the spacers 54 are generally aligned with cooling holes 72 in the magnetic shield 58 to allow cooling air to circulate between the rings 56. The ramps 64, 66 are formed with a ramp angle a (FIG. 9) that matches the angles formed on the chamfered radially inner edges 76, 78 of the rings 56. Note that one ring 56 in FIG. 7 is raised away from spacer 54 simply to assist in identifying edges 76, 78. Thus, the rings 44 fit closely into the "troughs" created by adjacent respective flat ends 52, 50 and ramps 66, 64 of respective adjacent spacers 54, and since the flat ends 52, 50 of the spacers are closely adjacent similar flat ends of adjacent spacers, axial migration of the rings 56 is substantially prevented. In other words, any minor axial shifting resulting from clearances between adjacent spacers is insufficient to permit migration of the rings to the extent of blocking any one or more cooling holes 72 in the magnetic shield 74. In this regard, while the individual spacers are not fixed to the magnetic shield, one or more stops 80 fixed at the ends of the magnetic shield serve to limit any axial migration of the entire group of spacers on the shield. Note that stop 80 may be an annular ring seated in an annular groove, or a plurality of pins located in holes in the shield at circumferentially spaced locations.

The spacers 54 are fabricated either from laminated fabric-based C/Ep or laminated mono-tapes. The high specific strength of C/Ep spacers insures more than ample capability for body and axial loading. The expansion rate of the spacer can also be designed through fiber architecture to either match or transition the rates of the composite ring and magnetic shield.

Figure 10:
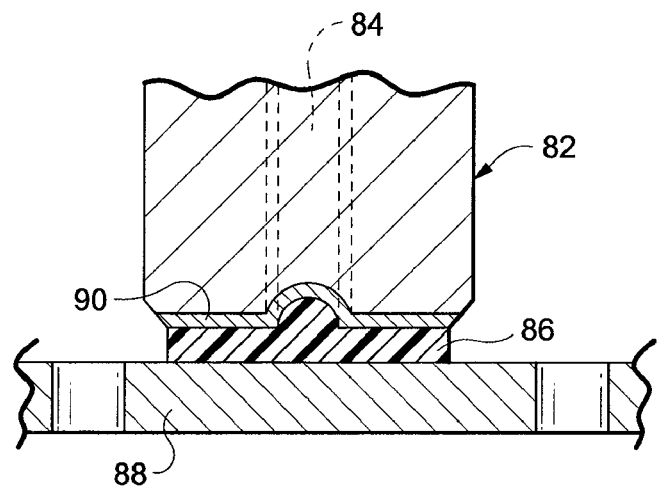
FIG. 10 is a partial side section illustrating a mechanical axial restraint system for the composite rings on the rotor in accordance with a second exemplary embodiment of this invention.

In a second exemplary embodiment shown in FIG. 10, the rings 82 are formed with a circumferential groove 84 on their respective radially inner surfaces. Epoxy adhesive 86 bonded to the magnetic shield 88 is prevented from bonding to the ring by means of a release agent 90 between the epoxy adhesive and the ring. Because the epoxy fills the groove 84, however, a mechanical barrier to axial migration of the rings is achieved. The release agent may be polytetrafluoroethylene, boron nitride or other suitable release agent.

Figure 11:
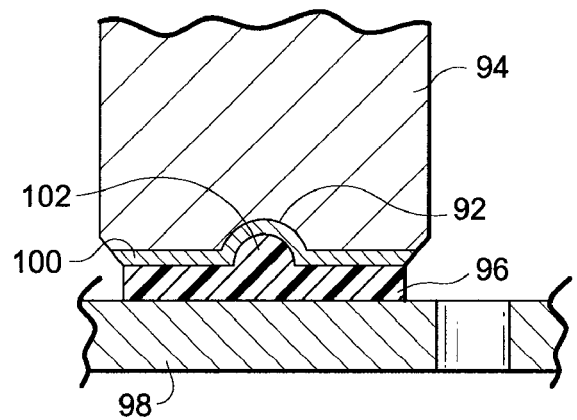
FIG. 11 is a partial side section illustrating a mechanical axial restraint system for the composite rings on the rotor in accordance with a third exemplary embodiment of this invention.

FIG. 11 illustrates a third embodiment of the invention where a series of semispherical concavities 92 are formed in the radially inner surfaces of the ring 94. Epoxy 96 bonds to the magnetic shield 98 but is prevented from bonding to the ring 94 by release agent 100 as described above. Here again, the epoxy cures to form solid dimples 102 that fill the concavities and form mechanical or physical barrier to axial migration of the rings.

The depth of the dimples or full annular groove can be on the order of about 0.03 to 0.05 inch while the axial width of the dimple or groove is designed to provide sufficient shear area to resist the axial stresses driving potential movement.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A magnetic shield assembly for confining rotor windings in a generator comprising a substantially cylindrical tubular shield of two or more part-annular segments adapted to enclose the rotor windings; a plurality of axially spaced rings located on said tubular shield; and a plurality of annular spacers radially between said tubular shield and said plurality of rings and axially between adjacent rings to thereby present physical barriers to axial migration of said plurality of rings.

2. The magnetic shield assembly of claim 1 wherein annular spacers are bonded via adhesive to said magnetic shield but are prevented from bonding to said rings by a release agent located between said adhesive and said rings.

3. The magnetic shield assembly of claim 1 wherein each of said annular spacers includes a pair of flat ends and a raised top surface connected to said pair of flat ends by a pair of angled ramps.

4. The magnetic shield assembly of claim 3 wherein said rings are formed with radially inner edges chamfered to substantially match said pair of ramps.

5. The magnetic shield assembly of claim 3 wherein said top surface is formed with a plurality of cooling slots.

6. The magnetic shield assembly of claim 3 wherein each ring is supported on flat ends of adjacent spacers.

7. The magnetic shield assembly of claim 1 including means for limiting axial movement of said spacers on said magnetic shield.

8. The magnetic shield assembly of claim 1 wherein said spacers are constructed of laminated fabric-based carbon epoxy.

9. The magnetic shield assembly of claim 3 wherein said spacers are constructed of laminated fabric-based carbon epoxy.

10. The magnetic shield assembly of claim 2 wherein said release agent comprises boron nitride.

11. A magnetic shield assembly for confining rotor windings in a generator comprising a substantially cylindrical tubular shield of two or more part-annular segments adapted to enclose the rotor windings; a plurality of axially spaced rings located on said tubular shield, said rings having a radially inner surface with at least one surface depression therein; and epoxy adhesive located between said rings and said magnetic shield and bonded to said magnetic shield, with a release agent between said epoxy adhesive and said rings; and wherein said at least one surface depression is filled with cured epoxy adhesive, thus forming a mechanical barrier to axial migration of said rings on said magnetic shield.

12. The magnetic shield assembly of claim 11 wherein said at least one surface depression comprises an annular groove.

13. The magnetic shield assembly of claim 11 wherein said at least one surface depression comprises a plurality of circumferentially spaced concavities.

14. The magnetic shield assembly of claim 11 wherein said at least one surface depression has a depth of between about 0.03 and 0.05 inch.

15. The magnetic shield assembly of claim 11 wherein said tubular shield is formed with a plurality of axially spaced cooling apertures and wherein said rings are axially spaced between said apertures.

16. The magnetic shield assembly of claim 11 wherein said release agent comprises polytetrafluorethylene.

17. The magnetic shield assembly of claim 11 wherein said release agent comprises boron nitride.

* * * * *

UNITED STATES PATENT AND TRADEMARK OFFICE
CERTIFICATE OF CORRECTION

PATENT NO. : 6,979,928 B2
DATED : December 27, 2005
INVENTOR(S) : Cairo

It is certified that error appears in the above-identified patent and that said Letters Patent is hereby corrected as shown below:

<u>Column 4,</u>
Line 31, delete "a" and insert -- $\alpha$ --.

Signed and Sealed this

Seventh Day of March, 2006

JON W. DUDAS
*Director of the United States Patent and Trademark Office*